3,026,249
PREPARATION OF STABLE AQUEOUS ISOMERIC VITAMIN A COMPOSITIONS
Stanley R. Ames, Rochester, N.Y., assignor to Eastman Kodak Company, Rochester, N.Y., a corporation of New Jersey
No Drawing. Filed June 30, 1960, Ser. No. 39,794
4 Claims. (Cl. 167—81)

The present invention concerns vitamin A compositions, and more particularly, the preparation of aqueous vitamin A compositions.

Aqueous vitamin A compositions are well-known and widely used compositions. However, in multivitamin compositions containing such vitamins as ascorbic acid (vitamin C) or thiamine salts (vitamin $B_1$) or the like, the vitamin A in such compositions readily loses potency or biological activity. Hence, it is common practice to add extra or overage amounts of vitamin A materials to aqueous multivitamin compositions to assure at least the labeled potency for a reasonable time after receipt of shipment from the manufacturer.

Stieg et al. in U.S. Patent No. 2,907,696, dated October 6, 1959, disclosed that the loss of potency in aqueous vitamin A compositions could be reduced by mixing the neo isomer (2-cis isomer) of vitamin A with all-trans isomer of vitamin A, the latter isomer being the usual isomer of commerce. However, I have found that mixtures of the neo and all-trans isomers still lose substantial potency in typical aqueous multivitamin compositions.

It is an object of this invention to provide a new process for preparing aqueous vitamin A compositions.

It is another object of this invention to prepare by a new process aqueous multivitamin compositions containing synthetic vitamin A esters wherein the vitamin A esters have improved stability to loss of biological activity.

It is likewise an object of this invention to prepare by a novel process, an aqueous multivitamin dispersion having a pH of less than 7 and containing vitamin C or vitamin $B_1$ and synthetic vitamin A acetate or synthetic vitamin A palmitate wherein the vitamin A material has improved resistance to loss in potency.

These and other objects of the invention are accomplished by providing synthetic vitamin A esters as a specific mixture of geometric isomers as described hereinafter and incorporating this isomeric mixture into an aqueous medium.

Vitamin A alcohol is a complex conjugated polyene, its well-known acyl esters having the following structure:

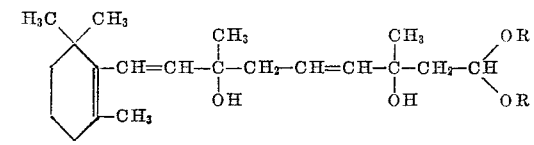

Vitamin A materials can exist in the form of several geometric isomers as are illustrated by the various cis and trans configurations around the olefinic bonds starred in the above formula, the 2 and 6 carbon atoms in the above formula being numbered for convenience of reference. A widely used vitamin A isomer of commerce is the all-trans isomer. The isomeric mixture used in the process of the invention consists essentially of 50% to 60% of the all-trans isomer, 15% to 25% of the 2-cis isomer, 15% to 20% of the 6-cis isomer and 5% to 10% of the 2,6-di cis isomer. A preferred isomeric mixture of the invention consists essentially of about 55% of the all-trans isomer, about 20% of the 2-cis isomer, about 18% of the 6-cis isomer and about 7% of the 2,6-di cis isomer.

Reference is made to the article by Robeson, Blum, Dieterle, Cawley and Baxter, Journal of American Chemical Society, 77, pages 4120–4125 (1955), wherein is described the various geometrical isomers of vitamin A aldehyde and their methods of preparation. Vitamin A aldehyde can be readily reduced to vitamin A alcohol by well-known techniques such as with such metal hydrides as lithium aluminum hydride, sodium borohydride, potassium borohydride and related reducing agents. The resulting vitamin A alcohol can be esterified by well-known esterification methods, typical esterifying agents being acetic anhydride and palmitoyl chloride. Fletcher U.S. Patent No. 2,848,466 describes a particularly useful method for esterifying vitamin A alcohol with acyl halides. Vitamin A alcohol can also be esterified by interesterification with such reactants as methyl acetate and methyl palmitate in the presence of an alkaline catalyst as described in Brokaw Canadian Patent No. 532,371. The synthetic vitamin A esters used in the process of the invention are vitamin A acetate or vitamin A palmitate, vitamin A palmitate being preferred.

The isomeric vitamin A ester mixtures of the invention can be prepared by mixing separately the various isomers in the prescribed proportions or ratios. Likewise, such isomeric mixtures can be prepared by isomerizing the all-trans isomer with an acidic material such as hydrochloric acid. Suitable isomeric mixtures can also be prepared by dehydrating and hydrolyzing a 1,1-dialkoxy - 3,7 - dimethyl - 3,7 - dihydroxy - 9 - (2,6,6-trimethylcyclohex-1-enyl)-nona-4,8-diene having the formula

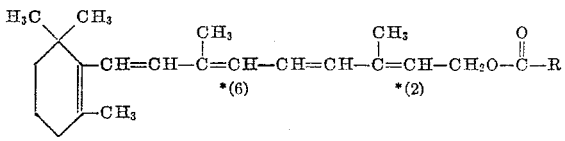

wherein R is an alkyl radical and more usually a lower alkyl radical having 1 to 8 carbon atoms and thereby forming an isomeric mixture of vitamin A aldehyde. This isomeric mixture can then be reduced to vitamin A alcohol and esterified as described above. The dehydration and hydrolysis of the 3,7-diol acetal described above can be effected with small amounts of acid materials such as hydrochloric acid, and materials that yield acid materials on hydrolysis such as chloroform and carbon tetrachloride, as described in Guntrum and Robeson U.S. Patent No. 2,676,991, Fletcher U.S. Patent No. 2,766,290 and Fletcher U.S. Patent No. 2,811,561.

The isomeric vitamin A ester mixtures of the invention are incorporated into aqueous multivitamin mediums which typically have pH's of less than 7 and more usually a pH in the range of about 3 to about 6. The present process has particular utility in the preparation of multivitamin aqueous compositions containing such water soluble vitamins as ascorbic acid and an acidic water soluble thiamine salt such as thiamine hydrochloride or thiamine mononitrate. Other oil soluble and water soluble vitamins that are conventionally used in the preparation of multivitamin compositions can also be present in the aqueous compositions prepared in accordance with the invention including riboflavin, pyridoxin, nicotinic acid, pantothenic acid, inositol, p-amino benzoic acid, vitamin D, vitamin E and fatty acid esters thereof, vitamin K and the like.

Solubilizing, dispersing or emulsifying agents are generally utilized in preparing aqueous compositions containing vitamin A materials. A wide variety of such agents can be employed in preparing the aqueous compositions of the invention in accordance with usual practice. Particularly useful dispersing agents are water soluble polyalkylene oxide derivatives of partial long chain fatty acid esters of polyhydric alcohols as described in Freedman and Green U.S. Patent No. 2,417,299, polyethylene glycol monoesters of straight chain higher aliphatic carboxylic acids as described in Rawlins U.S. Patent No. 2,541,285, and hydroxypolyoxyethylene ethers of long chain aliphatic alcohols as described in Freedman and Green U.S. Patent No. 2,518,230. Other well-known solubilizing, dispersing and emulsifying agents that can be used in preparing the present aqueous compositions include methyl cellulose, gum arabic, agar-agar, Irish moss gum, gum tragacanth, polyethylene glycol monoricinoleate, polyoxyethylated castor oil fatty acids etc.

The aqueous vitamin A compositions prepared in accordance with the invention have particularly good resistance to loss of biopotency as compared to conventional aqueous vitamin A compositions. The data set out in the table below illustrate the relative improved stability of the specific vitamin A isomeric mixtures of the invention as compared to conventional all-trans vitamin A compositions and vitamin A compositions containing the 2-cis isomer (the neo isomer) as well as the all-trans isomer in typical aqueous multivitamin compositions containing ascorbic acid (vitamin C) or a thiamine salt such as thiaminehydrochloride or thiaminemononitrate (vitamin $B_1$) having a pH of about 3 to 6 after a typical shelf life of about 6 months.

TABLE

| Synthetic Vitamin A Ester | Percent of Various Isomers | | | | Approx. Percent Loss of Relative Biopotency |
|---|---|---|---|---|---|
| | all-trans | 2-cis | 6-cis | 2, 6-di cis | |
| Vitamin A palmitate [1] | 55 | 20 | 18 | 7 | 0 |
| Vitamin A palmitate | 67 | 33 | 0 | 0 | 27 |
| Vitamin A palmitate | 100 | 0 | 0 | 0 | 33 |
| Vitamin A acetate [1] | 55 | 20 | 18 | 7 | 0 |
| Vitamin A acetate | 67 | 33 | 0 | 0 | 27 |
| Vitamin A acetate | 100 | 0 | 0 | 0 | 33 |

[1] Isomeric mixture of the invention.

As can be observed from the comparative data set out in the above table, the isomeric mixture of the invention has a substantially improved stability to loss of biopotency as compared to conventional and known vitamin A materials.

The isomeric vitamin A mixtures of the invention can be utilized in conventional liquid aqueous preparations or in capsules which usually contain smaller amounts of water.

The relative biopotencies referred to herein were determined by the slope-ratio liver storage procedure described by Ames and Harris in Anal. Chem. 25, 874–878 (1956), wherein both the aqueous vitamin A ester composition being tested and the U.S.P. vitamin A acetate reference solution were fed intragastrically to rats. The liver-storage of vitamin A from the aqueous vitamin A ester composition being tested relative to the U.S.P. vitamin A acetate reference solution determines the relative biopotency.

The following examples illustrate preferred embodiments of the invention.

Example 1

Two synthetic vitamin A palmitate preparations were incorporated into typical aqueous multivitamin dispersions, stored for 6 months at 37° C., and the loss of relative biological potency of the vitamin A determined for each preparation. The synthetic vitamin A palmitate in one preparation consisted essentially of the all-trans isomer at a potency of about one million units per gram. The synthetic vitamin A palmitate in the other preparation had substantially the same potency but consisted essentially of an isomeric mixture of the invention consisting essentially of about 55% of the all-trans isomer, about 20% of the 2-cis isomer, about 18% of the 6-cis isomer and about 7% of the 2,6-di cis isomer. This latter isomeric mixture of synthetic vitamin A palmitate is prepared by the general method described in Example 3 and is an isomeric mixture of the invention. The multivitamin aqueous dispersions had the following composition:

Vitamin A palmitate (containing 0.5% each BHA-BHT) _____ 10 gms. (1 million u./g.).
Vitamin $D_3$ _____ 1.7 gms.
Thiamine mononitrate _____ 1.67 gms.
Riboflavin-5'-phosphatosodium _____ 0.87 gm.
Nicotinamide _____ 8.33 gms.
Pyridoxine hydrochloride _____ 1.67 gms.
d-Panthenol _____ 3.33 gms.
Ascorbic acid _____ 83.33 gms.
Vitamin $B_{12}$ _____ 5 mg.
Methyl-p-hydroxybenzoate _____ 1.8 gms.
Propyl-p-hydroxybenzoate _____ 0.2 gm.
"Tween 80" (polyoxyethylene derivative of sorbitan monooleate) _____ 90 gms.
10 N NaOH (final dispersion pH=5.3) _____ 42.5 ml.
Citric acid-phosphate buffer (prepared by adding sufficient citric acid to a 10% aqueous solution of trisodium phosphate to decrease the pH to 5.3 _____ 10 ml.
Freshly boiled, distilled $H_2O$ _____ q.s./liter.

Each 0.6 cc. of the dispersion contained 5,000 units of vitamin A, 1 mg. of thiamine mononitrate, 50 mg. of ascorbic acid, 1,000 units of vitamin $D_3$, 0.4 mg. riboflavin (as 5'-phosphate sodium salt), 5 mg. nicotinamide, 1 mg. pyridoxine HCl, 2 mg. pantothenic acid (as d-panthenol), and 3 mcg. of vitamin $B_{12}$. The two aqueous dispersions were identical except for the source of vitamin A. The "BHA-BHT" referred to above are the well-known antioxidants, butylated hydroxy anisole and 2,6-di-tertiary butyl-4-methylphenol, respectively. After six months of storage at 37° C., the vitamin A in the multivitamin aqueous composition prepared with the all-trans isomer of vitamin A palmitate lost 34% of its relative biopotency, while vitamin A in the multivitamin aqueous composition prepared with the isomeric mixture of vitamin A palmitate of the invention lost only 6% of its relative biopotency. Similar results are obtained if vitamin A acetate was substituted for the vitamin A palmitate in the multivitamin aqueous compositions. Likewise, the substitution of thiamine hydrochloride for the thiamine mononitrate as the thiamine salt does not substantially alter the described comparative stability results.

Example 2

Isomeric mixtures of the invention of synthetic vitamin A acetate and vitamin A palmitate can be prepared by isomerizing all-trans vitamin A aldehyde to the desired isomeric mixture, reducing the resulting isomeric mixture of vitamin A aldehyde with sodium borohydride to an isomeric mixture of vitamin A alcohol, and thereafter esterifying the resulting isomeric mixture of vitamin A aldehyde with acetic anhydride or palmitoyl chloride to produce an isomeric mixture of vitamin A acetate or vitamin A palmitate consisting essentially of about 55% of the all-trans isomer, about 20% of the 2-cis isomer, about 18% of the 6-cis isomer and about 7% of the 2,6-di cis isomer as described: A 4 g. portion of the all-trans isomer of synthetic vitamin A aldehyde was dissolved in 50 cc. of methyl ethyl ketone containing 0.6 cc. of hydrochloric acid. The resulting mixture was then refluxed for one half hour to produce the desired vitamin A aldehyde isomeric mixture. The resulting vitamin A aldehyde isomers were reduced to vitamin A alcohol isomers in 30 cc. of methanol with about 0.1 g. of sodium borohydride by stirring for about one half hour at about 20° C. and by washing the resulting reaction product with 50 cc. N/2 potassium hydroxide. After separating out and drying the isomeric vitamin A alcohol mixture, the acetate ester was produced by treating with a molar proportion of acetic anhydride. Similarly, the palmitate ester is produced by treating the vitamin A alcohol with a molar proportion of palmitoyl chloride. These esterifications are effected at a temperature of about 45° C. for about one hour.

*Example 3*

The isomeric mixtures of the invention can be prepared by dehydrating and hydrolyzing the 3,7-diol acetal, 1,1 - dimethoxy - 3,7 - dimethyl - 3,7 - dihydroxy - 9- (2,6,6-trimethylcyclohex-1-enyl)-nona-4,8-diene, to produce a mixture of vitamin A aldehyde isomers which can then be reduced to the corresponding alcohol with lithium aluminum hydride and esterifying with palmitoyl chloride as described: A 40 cc. of methyl ethyl ketone containing 1.45 g. of quinoline and 20 cc. of methyl ethyl ketone containing 1.17 g. of concentrated hydrochloric acid were added to a solution of 11.0 g. of the 3,7-diol acetal in 80 cc. of methyl ethyl ketone. The resulting reaction mixture was refluxed for 90 minutes, cooled, poured into 500 cc. of water and extracted with ether. The ether extract was washed successively with 5% hydrochloric acid, 0.5 N potassium hydroxide, and water. The washed extract was then dried and evaporated to give 8.7 g. of vitamin A aldehyde as a reddish oil having $$E_{1\,cm.}^{1\%} (372m\mu) = 870$$

the vitamin A aldehyde consisting essentially of about 55% of the all-trans isomer, about 20% of the 2-cis isomer, about 18% of the 6-cis isomer and about 7% of the 2,6-di cis isomer. The isomeric vitamin A aldehyde mixture is readily reduced to vitamin A alcohol by use of an ether-soluble metal hydride as reducing agent. Thus, 0.6 ml. of a 1 M ethereal solution of lithium aluminum hydride was diluted with 0.6 ml. of anhydrous ether and the diluted solution was added over a 30 second interval to 0.32 g. of the prepared vitamin A aldehyde isomers dissolved in 3.2 ml. of absolute ether. Following the addition, the mixture was stirred for 2 minutes and the excess lithium aluminum hydride was decomposed with water. The product was worked up to give 0.35 g. of vitamin A alcohol having $$E_{1\,cm.}^{1\%} (326m\mu) = 1100$$

a blue color potency of 2,010,000 units of vitamin A per gram and the same geometrical isomeric content of the starting aldehydic material. The palmitate ester is then readily produced by treating the resulting isomeric mixture of vitamin A alcohol with a molar proportion of palmitoyl chloride at a temperature of about 45° C. for about one hour. The resulting synthetic vitamin A palmitate consists essentially of about 55% of the all-trans isomer, about 20% of the 2-cis isomer, about 18% of the 6-cis isomer and about 7% of the 2,6-di cis isomer.

Thus, in accordance with the invention aqueous vitamin A compositions having improved resistance to loss of biopotency are provided.

Although the invention has been described in considerable detail with reference to certain preferred embodiments thereof, it will be understood that variations and modifications can be effected within the spirit and scope of the invention as described hereinafter and as defined by the appended claims.

I claim:
1. The process for preparing a stabilized vitamin A composition which comprises providing an isomeric mixture of an ester of synthetic vitamin A alcohol selected from the group consisting of vitamin A acetate and vitamin palmitate consisting essentially of 50% to 60% of the all-trans isomer, 15% to 25% of the 2-cis isomer, 15% to 20% of the 6-cis isomer and 5% to 10% of the 2,6-di cis isomer, and incorporating said isomeric mixture into an aqueous medium.

2. The process for preparing a stabilized vitamin A composition which comprises providing an isomeric mixture of an ester of synthetic vitamin A alcohol selected from the group consisting of vitamin A acetate and vitamin A palmitate consisting essentially of 50% to 60% of the all-trans isomer, 15% to 25% of the 2-cis isomer, 15% to 20% of the 6-cis isomer and 5% to 10% of the 2,6-di cis isomer, and incorporating said isomeric mixture in an aqueous composition having a pH in the range of about 3 to about 6.

3. The process for preparing a stabilized vitamin A composition which comprises providing an isomeric mixture of an ester of synthetic vitamin A alcohol selected from the group consisting of vitamin A acetate and vitamin A palmitate consisting essentially of about 55% of the all-trans isomer, about 20% of the 2-cis isomer, about 18% of the 6-cis isomer and about 7% of the 2,6-di cis isomer, and incorporating said isomeric mixture in an aqueous medium having a pH in the range of about 3 to about 6 and containing a water soluble vitamin selected from the group consisting of ascorbic acid and a water soluble thiamine salt selected from the group consisting of thiamine hydrochloride and thiamine mononitrate.

4. The process for preparing a stabilized vitamin A composition which comprises providing an isomeric mixture of synthetic vitamin A palmitate consisting essentially of about 55% of the all-trans isomer, about 20% of the 2-cis isomer, about 18% of the 6-cis isomer and about 7% of the 2,6-di cis isomer, and dispersing said isomeric mixture in an aqueous medium having a pH in the range of about 3 to about 6 and containing a water soluble vitamin selected from the group consisting of ascorbic acid and a water soluble thiamine salt selected from the group consisting of thiamine hydrochloride and thiamine mononitrate with a water soluble polyoxyethylene derivative of sorbitan monooleate.

References Cited in the file of this patent
UNITED STATES PATENTS
2,907,696   Stieg et al. _____ Oct. 6, 1959